Jan. 29, 1946.  C. R. JOHNSON  2,393,689
TAILSTOCK
Filed July 29, 1944
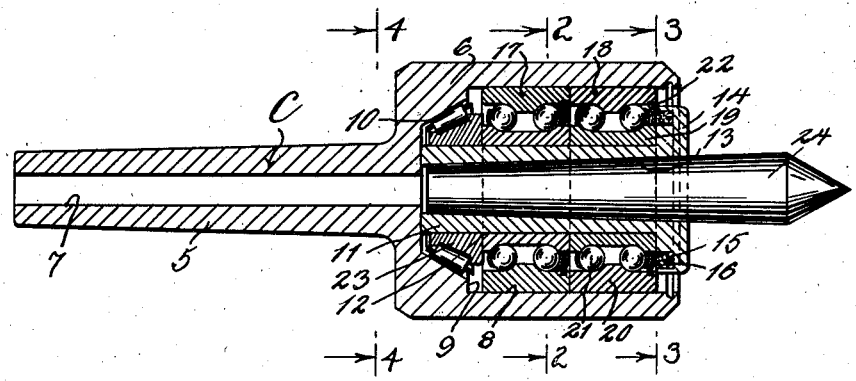
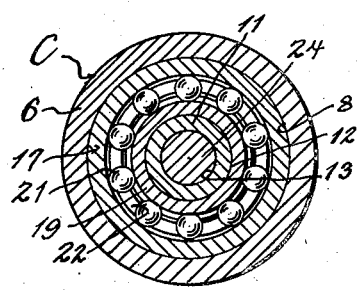 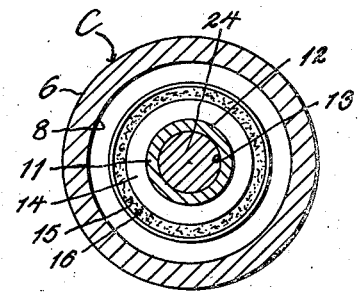
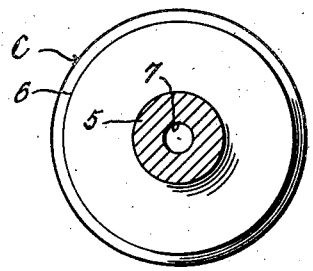
INVENTOR
CARL R. JOHNSON
ATTORNEYS Patented Jan. 29, 1946

2,393,689

UNITED STATES PATENT OFFICE 2,393,689

TAILSTOCK

Carl R. Johnson, Milwaukee, Wis.

Application July 29, 1944, Serial No. 547,226

1 Claim. (Cl. 82—33)

This invention appertains to centers and more particularly to live or antifriction centers for lathes and other machines.

One of the primary objects of my invention is to provide a live center embodying an internally tapered female sleeve for frictionally receiving a tapered spindle or point, the sleeve in turn carrying the anti-friction bearings, which are removably mounted in a hollow head formed on the center shank.

Another salient object of my invention is to provide a live center in which either the spindle or the spindle, sleeve and bearings, as a unit, can be quickly and easily removed from the head, whereby the desired type of spindle can be associated with the sleeve or repairs or replacements can be made to the bearings.

A further important object of my invention is to provide means associated with the sleeve for effectively holding a lubricant in the bearings and to prevent the entrance of chips and dirt into said bearings.

A still further object of my invention is to provide a live center of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawing, in which drawing:

Figure 1 is a longitudinal sectional view through my improved live center.

Figure 2 is a transverse sectional view taken through the head of the center on the line 2—2 of Figure 1 looking in the direction of the arrows.

Figure 3 is a similar view, but taken on the line 3—3 of Figure 1 looking in the direction of the arrows and illustrating the means carried by the sleeve for holding the lubricant in the bearings.

Figure 4 is a transverse sectional view taken through the shank of the center on the line 4—4 of Figure 1 looking in the direction of the arrows.

Referring to the drawing in detail, wherein similar reference characters designate corresponding parts throughout the several views the letter C generally indicates my improved live center and the same includes the shank 5 having formed on its forward end the concentric hollow head 6. The shank 5 can have its outer face formed in any desired manner for reception in any particular type of chuck. In accordance with my invention, however, the shank is provided with a longitudinally extending axially disposed bore 7 which opens into the hollow head 6.

The head 6 is provided with a cylindrical inner face 8 which terminates in a shoulder 9. The shoulder in turn leads to an angular concentric thrust bearing face 10, the purpose of which will later appear.

Insertable in the head is the female sleeve 11 and this sleeve forms an important part of my invention. As illustrated, the sleeve is provided with a smooth cylindrical outer face 12 and an axially disposed tapered bore 13. The outer end of the sleeve has formed thereon or connected thereto a face plate 14 which projects beyond the outer face of the sleeve. The inner surface of the face plate beyond the sleeve is provided with an angular concentrically disposed groove or channel 15 in which is packed a gasket 16 preferably formed from felt or the like.

Pressed upon the outer face of the sleeve are a pair of bearings 17 and 18 which can be of the ball type. These bearings are adapted to bear lateral loads and each are of the same construction and each include an inner race ring 19 and an outer race ring 20. Intermediate said respective race rings are disposed a series of anti-friction balls 21 retained in properly mutually spaced relation one to the other by a ball cage or retaining ring 22. The inner race rings 19 are placed on the sleeve with a press-fit and the outer end of the sleeve carries a thrust bearing 23 which can be of the roller type and the rollers are adapted to engage the inclined shoulder 12 of the head. When the bearing members 17, 18 and 23 are fitted on the sleeve, the front bearing 18 is placed tight up against the gasket 16 and this gasket functions to hold the grease in the bearing and to prevent the entrance of dirt and chips into the bearings. If desired the head 6 can be provided with means for permitting the introduction of grease into the bearings.

Frictionally fitted within the internally tapered sleeve 11 is the tapered spindle or center point 24 and consequently the spindle or center point normally rotates with the sleeve as a unit with the inner race rings of the bearings 17, 18 and 23.

In use of my tailstock the spindle 24 is frictionally fitted within the sleeve and the outer race rings 20 of the bearings 17 and 18 are frictionally driven into the head. The tailstock is now ready for use. When it is desired to remove the spindle or center point 24, it is merely necessary to insert a rod in the bore 7 against the inner end of the spindle and to then give the rod a sharp blow which will dislodge the spindle from the sleeve. When it is desired to remove the bearings with the sleeve, then the spindle is first tapped on its outer end to tightly drive the same into the sleeve. Now, the spindle is tapped with the rod from the inner end and as the spindle is driven from the head the same will carry the bearings therewith. If it is necessary to remove the bearings from the sleeve, then a clamp is employed for drawing the inner race rings of the bearings off of the sleeve.

From the foregoing description, it can be seen that I have provided an exceptionally simple and durable type of live center for lathes and other machines. With my type of center, if a wobble should develop, a shim of the desired thickness can be placed between the spindle and the sleeve at the correct point for centering up the spindle.

Changes in details may be made without departing from the spirit or the scope of my invention, but what I claim as new is:

A live center for lathes and other machines comprising a shank having a forwardly projecting hollow head, said shank also having an axially disposed bore leading into said head, said head having a cylindrical inner face and a cone bearing face at the inner end of said cylindrical face, a sleeve having an outer cylindrical face and an internally tapered bore, lateral bearing members having inner race rings pressed upon said sleeve and a thrust bearing having an inner race ring pressed upon the sleeve, said lateral bearings having outer race rings adapted to frictionally engage the cylindrical internal face of the head and said thrust bearing being adapted to engage the cone bearing surface of the head, and a tapered spindle frictionally fitted in the tapered bore of the sleeve.

CARL R. JOHNSON.